United States Patent [19]

Iftikar et al.

[11] 4,030,132
[45] June 14, 1977

[54] DUAL MODE VELOCITY SERVO CONTROL FOR A LINEAR ACTUATOR MOTOR

[75] Inventors: Syed H. Iftikar, San Jose; Bing M. Leong, Sunnyvale, both of Calif.

[73] Assignee: Memorex Corporation, Santa Clara, Calif.

[22] Filed: Mar. 27, 1975

[21] Appl. No.: 562,682

[52] U.S. Cl. .................................. 360/78; 318/617; 360/77; 360/105

[51] Int. Cl.² .................... G11B 5/56; G11B 21/08; G11B 17/00

[58] Field of Search ............ 360/78, 77, 75, 97–98, 360/105, 106, 109; 310/13, 12, 19; 318/616–618

[56] References Cited

UNITED STATES PATENTS

| | | |
|---|---|---|
| 3,699,555 | 10/1972 | Du Vall .............................. 360/77 |
| 3,789,378 | 1/1974 | Bonzano et al. ..................... 360/77 |
| 3,827,081 | 7/1974 | Prieur ................................. 360/105 |
| 3,893,180 | 7/1975 | Braun et al. ......................... 360/77 |

Primary Examiner—Alfred H. Eddleman
Attorney, Agent, or Firm—Limbach, Limbach & Sutton

[57] ABSTRACT

A servo system for controlling the movement of one or more magnetic transducer heads relative to rotating magnetic disc surfaces which are supported and transported by means of a linear actuator motor having position and velocity modes of control, and which additionally has an anticipatory mode of control which provides a compensatory signal proportional to the rate of change of the servo velocity error over the operating frequencies of the system so that the linear actuator motor is responsive to both the velocity error and compensatory mode signals to reduce velocity overshoots from a predetermined programmed velocity profile.

13 Claims, 12 Drawing Figures

DUAL MODE VELOCITY SERVO CONTROL FOR A LINEAR ACTUATOR MOTOR

BACKGROUND OF THE INVENTION

The present invention relates to an improved servo control system, and in particular to one particularly suited for use in controlling a linear actuator motor in a magnetic disc file system.

The two major functions of the transducer head-positioning servo mechanism in a magnetic disc file are track-accessing and track-following. The track-accessing function provides minimum time movement of a recording head from its existing track, which is a circular recording band at a specified disc radius, to a different track specified by the file controller. The track-following function maintains the position of the recording heads exactly over the center of a given track with minimum displacement error in the presence of disturbances. Examples of systems for performing the latter function are found in U.S. Pat. Nos. 3,534,344 and 3,691,543.

The present invention is related to the track-accessing function provided by the head-positioning servo mechanism. The track-following servo is useful only over distances of approximately plus or minus one-half track, thus is incapable of controlling a transducer head motion over distances of many tracks. Furthermore, the objective of an accessing servo is to achieve minimum move time between any two tracks on the disc, rather than to achieve best accuracy in following a specific track.

The transducer head control theory is to initially apply full forward power to the actuator until some point at which there is a switch to full reverse power until motion stops, hopefully at the exact center of the desired destination track. However, implementation of such a system that also has the desired reliability is prohibitively expensive, and so a slight compromise is made in control. Full forward power is initially applied, but as soon as the system velocity position corresponds to a trajectory defined by the control circuit, reverse power is applied under closed loop control. This maintains the system on the trajectory the remaining distance to the target track.

As disc drives have become more sophisticated with faster access times, the carriage, which supports and drives the transducer heads across the magnetic disc surfaces, moves faster. Consequently, there have been larger overshoots as the actual transducer head velocity approaches the trajectory defined by the control circuit, which makes the system sub-optimal.

Typically, a linear positioning motor is used as the actuator to position the magnetic recording transducer heads with respect to the magnetic disc surfaces. This type of motor includes a permanent magnet surrounding a movable armature coil which is attached to the head-positioning carriage. By passing current through the coil, forces required to move the heads from one position to another are generated. The direction of motion is determined by the polarity of the current through the coil.

As the velocity error changes polarity, the current through the movable armature coil does not instantaneously change polarity because of the inductance in the armature coils. As a result, there is a finite time after instigation of the armature current switching before the current through the armature, in fact, changes polarity. During this period of time, the current, being of the wrong polarity for proper transducer velocity control, actually aids in increasing the velocity error. This results in the velocity error overshoot being even greater, both in amplitude and duration, than overshoot from mechanical oscillations.

Larger overshoots result in longer bobbin current duration and, for short seeks, in larger current amplitude. This results in the generation of severe accelerating forces on the disc drive system resulting in longer settling time for mechanical vibrations and greater off-track problems. Both of the latter result in longer average access time.

Larger current amplitudes and longer current durations also result in greater heat dissipation and higher armature temperatures. Higher temperatures in turn create thermal off-track problems for the transducer heads. Higher temperatures also increase the effective armature coil resistance, resulting in lowering the linear motor force constant.

A few solutions have helped to decrease this problem of velocity error overshoot, but these solutions have had their own problems associated with them. For example, a higher force constant motor with low inductance can be used to decrease the velocity overshoot, but it has several disadvantages. It is very expensive to manufacture and creates greater mechanical vibrations because of the higher forces it generates. It also requires magnetic shielding to insure the safety of the recorded data on the magnetic disc pack. Also, a larger motor with higher currents requires more cooling.

Increasing bandwidth by increasing servo gain reduces overshoot and settling time and thus reduces access time, but the upper limit on bandwidth is controlled by the need to maintain stability in the presence of high frequency mechanical-structural resonances. Low pass filters can be used to filter out these noise components, but such filters introduce further lag between the desired velocity error signal and the actual velocity error signal.

SUMMARY OF THE INVENTION

It is therefore an object of the present invention to provide a servo control system for a magnetic disc file which minimizes velocity error overshoots.

Another object of the invention is to provide an improved servo control system for a magnetic disc recording device which has lower average access times.

Another object of the present invention is to provide an improved servo control system which utilizes inexpensive actuating means without need of special cooling or shielding apparatus.

In accordance with the present invention, a two-mode velocity servo control is employed. The first mode is a direct proportional control which controls the linear actuator motor in accordance with the difference between a programmed velocity profile and the actual or current motor/head velocity. The second mode of control provides a compensatory signal to the linear actuator which is proportional to the rate of change of the velocity error signal in the range of operating frequencies of the servo system. This mode anticipates in advance the intersection of the current or actual transducer head velocity with the programmed velocity profile. The linear actuator motor is responsive to both these modes of control so that the actual motor velocity follows the program velocity profile with minimal overshoots and more faithfully than in prior art servo control systems.

The servo control system of the present invention takes into account the delay in the actuator motor armature current switching due to inductance of the armature coil windings. Thus, this dual mode control system anticipates the zero velocity error point and regulates the linear motor armature current by varying the amplitude and duration of the current even before the velocity error crosses the velocity profile.

Since there is less overshoot and hence less servo system instability, higher servo gain and lower amplitude and duration of armature coil currents is possible, resulting in lower actuator accelerations which in turn lowers the amplitude of mechanical vibrations.

By being able to increase the gain, the average seek access time is reduced. This results from the increase in gain possible which insures that the actual head velocity more closely approximates the programmed velocity profile, which in turn has the effect of reducing settling time and making it more likely that the transducer head will arrive at the desired track location without thereafter having to be jockeyed to the correct track. All of this reduces the average access time.

The ability to minimize the actuator armature current means that the actuator temperature stays lower which results in less thermo off-track problems and a more constant motor force constant. Reduced current results in less mechanical vibrations and mechanically-induced noise. Reduced current also reduces system noise caused by large current spikes when the polarity of the linear actuator motor is reversed.

In accordance with another aspect of the present invention, the anticipatory control mode is attenuated beyond the response of the servo system so that high frequency noise is not introduced into the servo control system. To further insure proper servo control operation, once the head is at or nearly at the desired track location, the anticipatory mode of control is switched off. This is to prevent the introduction of false compensatory signals resulting from the pickup of noise.

DESCRIPTION OF THE PREFERRED EMBODIMENT

Figure 1A:
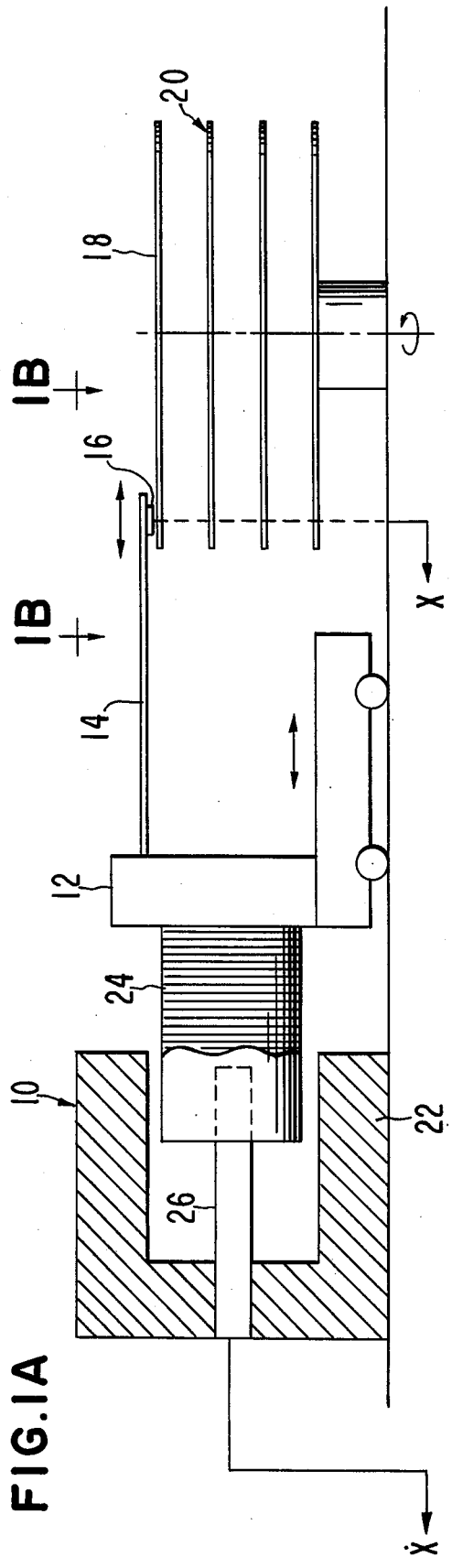
FIG. 1A is a schematic elevation view of a linear positioning actuator or motor used to position the magnetic recording transducer heads in a magnetic disc recording system.
Figure 1B:
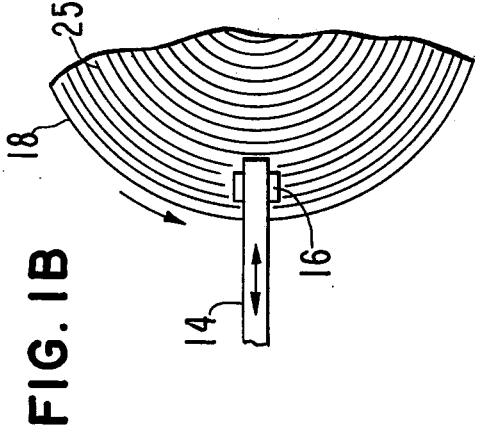
FIG. 1B is a top view of the recording head.

In FIGS. 1A and 1B a linear actuator motor 10 is used for driving a carriage 12 to which is secured a head arm assembly 14 terminated by a magnetic transducer head 16 for positioning the latter radially with respect to one disc surface 18. The disc surface 18 can form the single disc surface or can be one of a plurality of discs 20 as shown in FIG. 1A. The discs rotate in the direction indicated in FIG. 1. Although only a single head/arm assembly 14 is shown attached to carriage 12 in FIG. 1A, additional head/arm assemblies may be and usually are attached to carriage 12 to provide transducer heads for both sides of each of the magnetic discs 20. They have been omitted here only for purposes of illustration.

The linear actuator motor 10 is of a type frequently referred to as a "voice-coil" motor, and includes a permanent magnet 22 which surrounds a movable armature or "bobbin" coil 24 which is attached to the head positioning carriage 12. By passing current through the coil 24, forces required to move the heads 16 radially from one position to another on the disc surface 18 are generated. A "bang-bang" type of relay 25 switches the armature current between maximum positive and maximum negative values. The direction of motion of the armature coil 24 is dependent upon the polarity of the current passing through it.

Referring to FIG. 1B, as the transducer head 16 passes radially across the disc surface 18, it passes over circular recording bands or tracks which are indicated by reference numerals 25. In FIG. 1B the tracks are highly exaggerated. Also, in the case of an actual disc, these tracks are invisible to the naked eye. Information recorded on these tracks enables the transducer to provide a position or location signal $x$ which is utilized by the servo control system in a manner to be described subsequently.

A tachometer which comprises a coil 26 provides a velocity signal $\dot{x}$ as the armature coil passes coaxially along its length. This signal is also used by the servo control system in a manner to be described.

Figure 2:
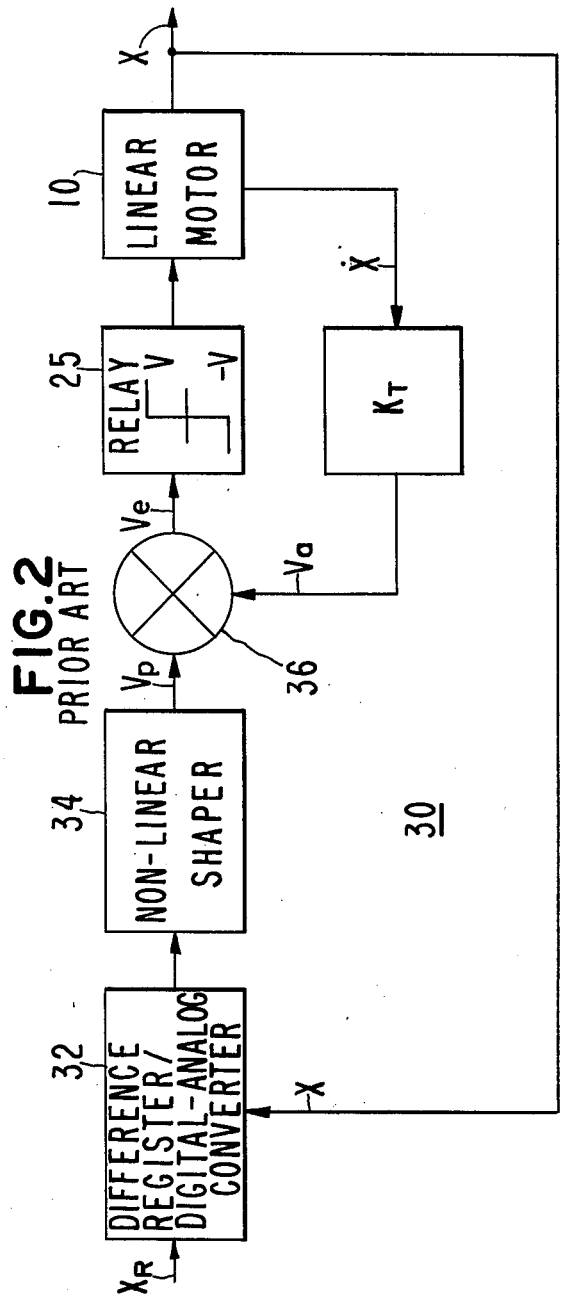
FIG. 2 is a block diagram of a prior art servo control for a magnetic disc file system.

FIG. 2 is a block diagram of a typical velocity servo system 30 used for accessing the magnetic transducer head 16 by means of the linear actuator motor 10. When a seek is initiated to a new track position, a difference register 32 is loaded with the number of net track difference, i.e. the total number of tracks which the head must be transported to reach the desired track, where it is converted to an analog signal. A nonlinear shaper 34 creates an analog signal, $v_p$, which is the programmed velocity or velocity profile and forms the command signal for the velocity servo which initiates motion of the carriage 12 towards the desired track. The control or error signal, $v_e$, for the velocity servo 30 is provided by the difference at summing junction 36 between the programmed velocity signal $v_p$ and the actual velocity from the tachometer 26, $v_a$.

As the carriage 12 transports the magnetic transducer 16 across the disc tracks toward the desired track, the difference register 32 is decremented by one for every track crossed. Consequently, the programmed velocity, $v_p$, is gradually shaped to almost zero to provide an optimum trajectory to reach the desired track. Almost one track before the desired track, the difference counter goes to zero. At this point, the velocity servo 30 uses the track following mode and the position error signal to bring the carriage 12 to the desired track location. Examples of the latter are described in greater detail in the two patents referred to above.

The velocity error signal, $v_e$, regulates the seek velocity of the bobbin in the linear positioning motor 10, initially accelerating the carriage 12 to a high velocity and periodically slowing the bobbin 24 as it approaches an intended track, depending upon the full polarity of the velocity error signal.

For greater detail about the operation of conventional servo control systems like that of servo 30 of FIG. 2, reference is made to "Design of a Disc File Head-Positioning Servo" by R. K. Oswald, IBM J. Res. Develop., November 1974, pages 506–512, and particularly pages 510–512.

Figure 3A:
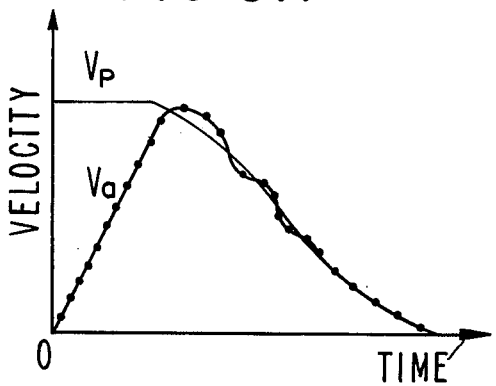
FIGS. 3A, 3B, 3C, illustrate respectively, plots of velocity, velocity error and motor current versus time, for an ideal disc drive actuator control system.
Figure 3B:
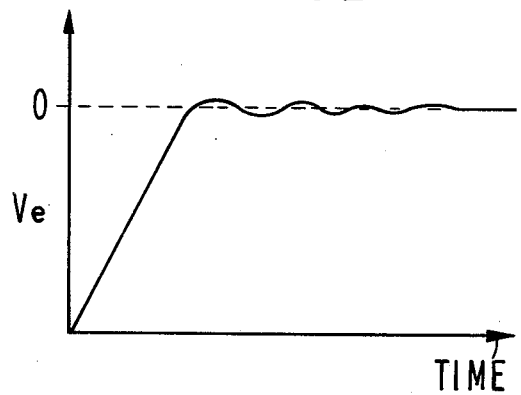
Figure 3C:
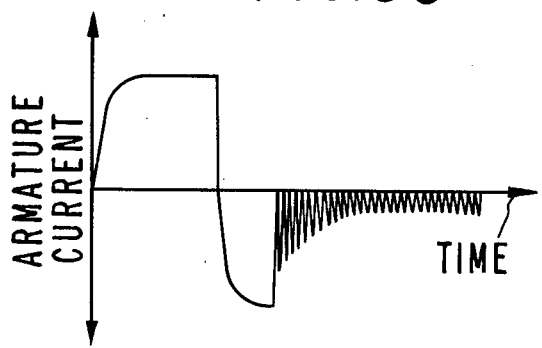

FIGS. 3A, 3B, and 3C, show, respectively, the ideal characteristics of velocity, velocity error, and motor current as a function of time for a typical seek from one track to another. Note in FIG. 3A that once the actual carriage velocity, $v_a$, intersects the velocity profile curve, it very quickly settles down and conforms to the velocity profile curve with very little velocity overshoot. Similarly, in FIG. 3B the velocity error as a function of time very quickly goes to zero. In FIG. 3C, the armature current very quickly goes down to a low steady state value.

Figure 4A:
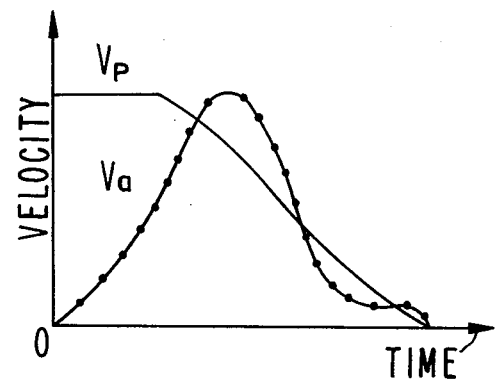
FIGS. 4A, 4B and 4C illustrate respectively plot of velocity, velocity error and motor current versus time, for a typical disc drive actuator control system.
Figure 4B:
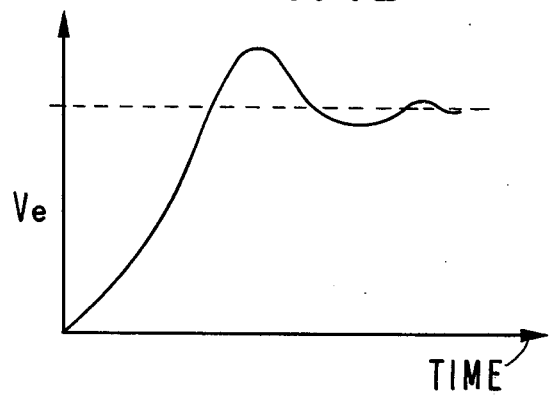
Figure 4C:
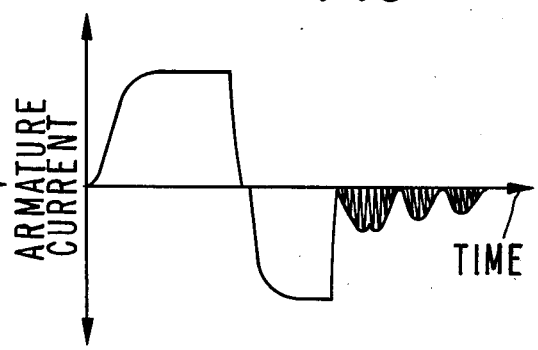

But in actual practice, the servo characteristics are far from the ideal case shown in FIGS. 3A–3C. More typically, the velocity, velocity error and motor current as a function of time for a typical seek are illustrated respectively in FIGS. 4A, 4B and 4C. Note that in FIG. 4A, once the actual velocity intercepts the program velocity profile, rather than quickly following the profile, large overshoots result. This is due to mechanical inertial problems and to the inductance of the armature coil as explained previously. Similarly, the velocity error as a function of time does not quickly settle down at zero error but rather oscillates above and below the zero velocity error level. As shown in FIG. 4C, greater armature currents result compared with the more nearly ideal situation of FIG. 3C. The disadvantages of larger overshoots and larger current amplitudes and durations have been discussed previously. They result in longer settling time and hence greater average access time and in greater heating and noise problems than in the ideal situation illustrated in FIGS. 3A–3C.

Figure 5:
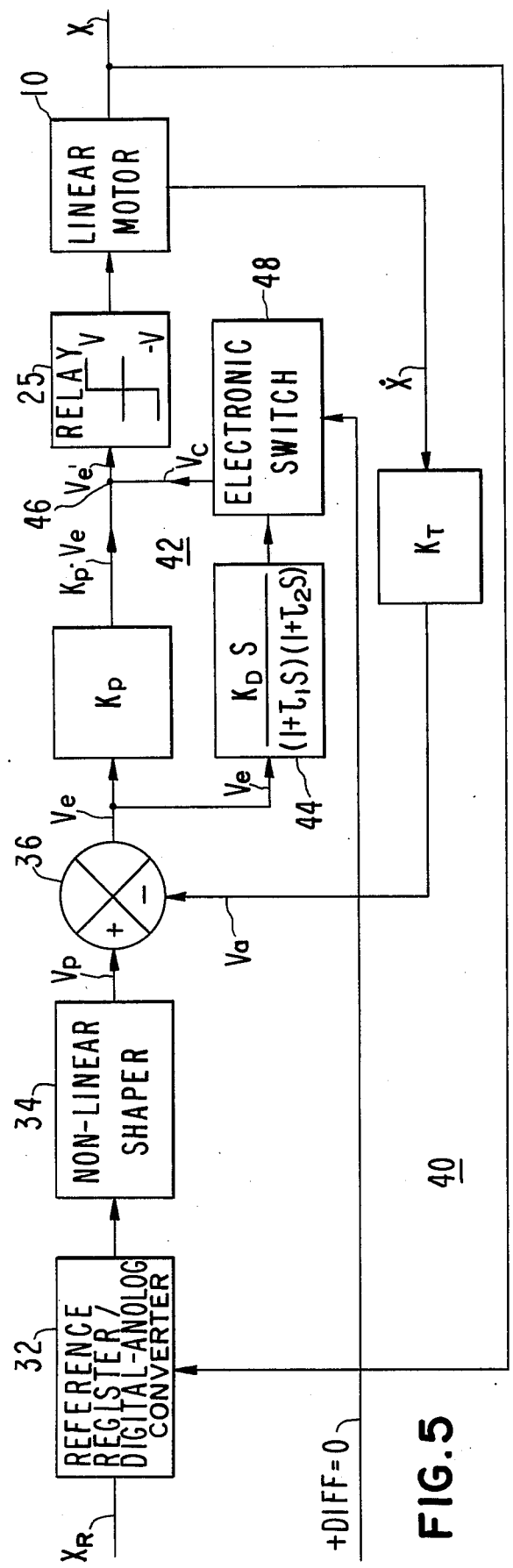
FIG. 5 is a block diagram of an embodiment of the present invention.

FIG. 5 is a block diagram of one embodiment of the servo control system 40 incorporating the subject invention. The digital-to-analog converter 32 converts the digital address in the difference register to an analog signal as in the servo 30 of FIG. 2. A nonlinear shaper 34 shapes and conditions the analog signal to provide the optimum trajectory or program velocity, $v_p$. The summer 36 provides the velocity error, $v_e$, from the difference between the programmed velocity, $v_p$, and the tachometer 26 output signal, $v_a$.

In accordance with the present invention, a second mode of control is provided which comprises an anticipatory circuit 42, which anticipates optimum velocity trajectory crossing and regulates the armature current so that the actual velocity, $v_a$, follows the programmed velocity, $v_p$, with minimal overshoots.

Anticipatory circuit 42 includes a circuit 44 which has a feedback Laplace transfer function given by:

$$Ga(s) = \frac{K_d s}{(1 + \tau_1 s)(1 + \tau_2 s)}$$

where $K_D$ = gain of anticipatory mode $\tau_1 > \tau_2$. And, where the block $K_p$ is the gain $K_p$ of the proportional mode of control, the Laplace transfer function of the servo 40 is given by:

$$Gc(s) = K_p + \frac{K_d s}{(1 + \tau_1 s)(1 + \tau_2 s)}$$

Ideally, the gain $K_p$ is approximately equal to unity and the gain $K_d$ is approximately equal to five.

Figure 6:
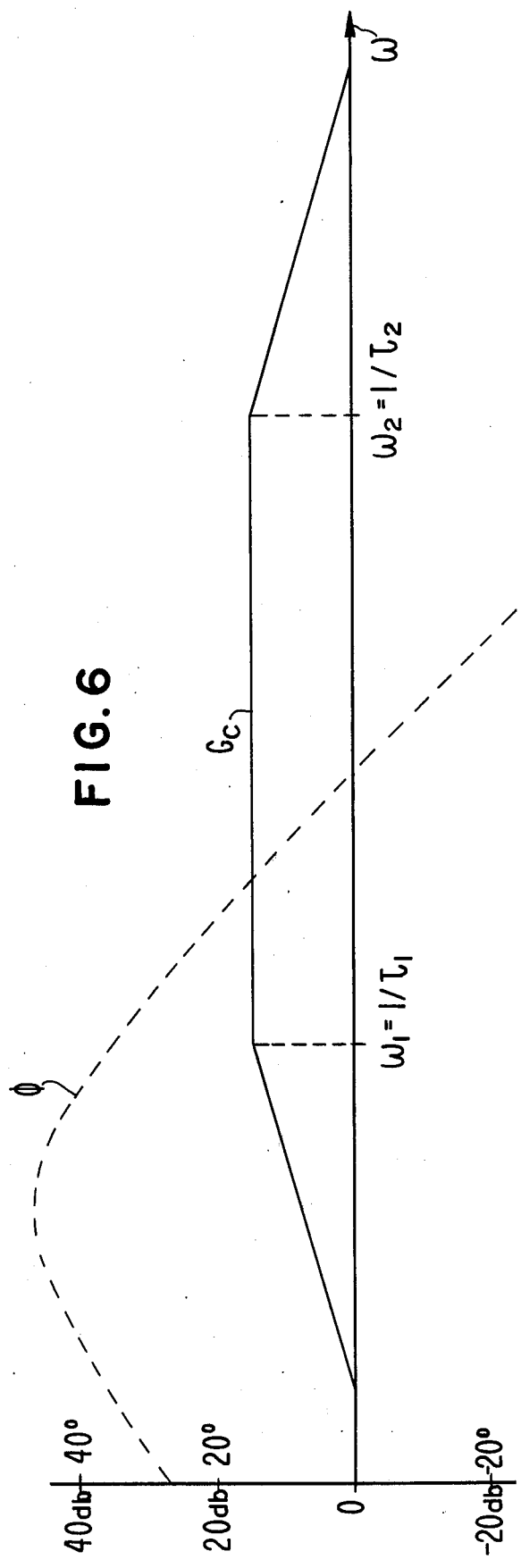
FIG. 6 is a bode plot of the frequency response of the control circuit of FIG. 5.

FIG. 6 is a frequency domain (bode) plot of the transfer function Gc(s) for servo 40 of FIG. 5, with the amplitude of Gc(s) shown as a straight line asymtotic approximation and showing the phase angle.

The pole time constant $\tau_1$ and hence $\omega_1$, is chosen to attenuate the differentiation carried out by 44 at a frequency beyond the frequency bandwidth of the servo, as shown in FIG. 6. Up to $\omega_1 = 1/\tau_1$ circuit 44 acts exactly as a differentiator, providing a compensatory signal $v_c$ proportional to the rate-of-change of the motor control signal. When added to the proportional mode derived error signal $K_p \cdot v_e$ at 46 a dual mode, velocity error signal, $v_e'$ is formed.

Further attenuation is provided above $\omega_2 = 1/\tau_2$ to further reduce the high frequency noise associated with 44 from entering adjacent amplifiers $K_D$ and $K_p$.

In summary, the effect of the anticipatory circuit 42 is to provide a dual or compensatory mode signal for controlling the acceleration and deceleration of the motor 10. Over the response of the servo 40 a derivative signal, proportional to the rate-of-change of the servo control signal, is provided which is added to the first order, proportional velocity control signal. This results in an anticipation of the intersection of the actual response more like that of FIGS. 3A, 3B and 3C. Above the frequencies of operation of the servo the differentiator of circuit 44 is curtailed and attenuated so that noise is reduced in the servo loop outside of the frequency band of operation, and this is accomplished without decreasing the voltage/current phase angle within the frequency range of operation.

To prevent the introduction of noise signals from 44 after a seek has taken place, a switch 48 is included in the compensatory circuit loop. This switch is closed when the head is at, or nearly at, the desired track location, thereby discontinuing the compensatory mode signal to the motor.

Figure 7:
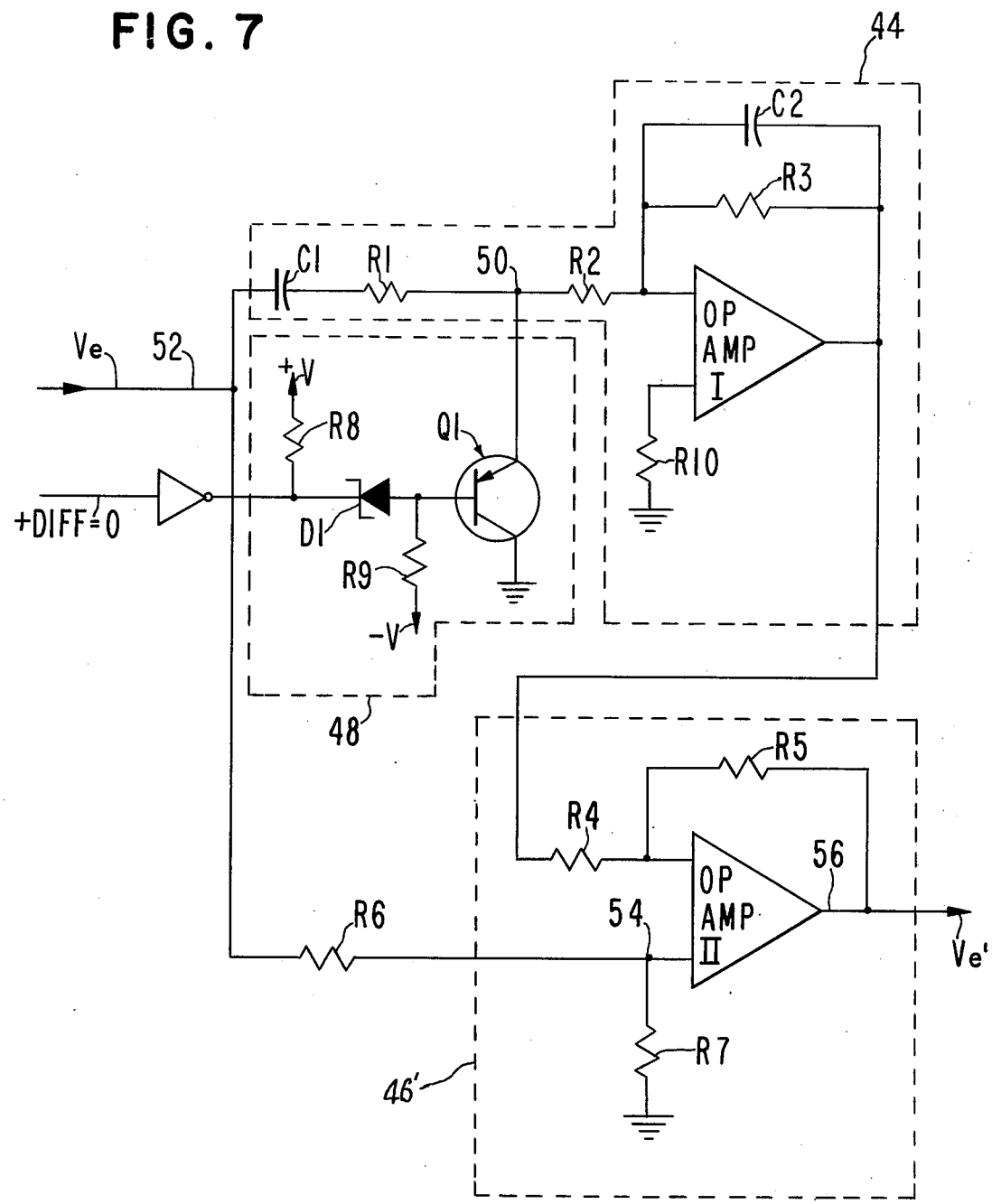
FIG. 7 is a schematic illustration of the anticipatory mode circuit of FIG. 5.

FIG. 7 is a schematic illustration of an actual embodiment of anticipatory circuit 42. The switch 48 consists of transistor $Q_1$, diode $D_1$, and resistors R8 and R9. When +diff = 0, chopper transistor $Q_1$ is turned on and clamps 50 to near zero shorting out the differentiated signal thereby disabling the differentiated signal.

But when the differentiated mode is required, switch 48 turns off; operational amplifier (op amp) I and its associated components (C1, R1, R2, C2, R3) differentiates the signal $v_e$ and also filters out its high frequency components.

Op amp II and its associated components (R6, R7, R4, R5) form circuit 46' and act as a summer and amplifier to derive the dual mode signal $v_e'$. It sums the differentiated and proportional signals along paths 52, 50, 56 and 52, 54, 56, respectively. It also amplifies the differentiated signal by 5 as $K_D$ and the proportional signal by unity as $K_p$. Thus, the circuit 46' comprises the summing node 46 and provides the amplification $K_p$ and $K_D$ for the circuit block $K_p$ and circuit 44, respectively.

The circuit of FIG. 7 has been incorporated in an actual disc drive system manufactured by the assignee of the subject invention in its Memorex Model 3675 disc file system. The specific components used in the circuit of FIG. 7 are included in the following table.

| | |
|---|---|
| R1 = 5-11K | R8 = 2K |
| R2 = 5.11K | R9 = 11K |
| R3 = 10K | R10 = 10K |
| R4 = 2.15K | C1 = .018µF |
| R5 = 10K | C2 = 750 pF |
| R6 = 10K | Q1 = 2N2945 |
| R7 = 2.15K | D1 = 5.2 v Zener diode |

With these values, $\omega_1$ is equal to approximately 880 Hz. and $\omega_2$ is equal to approximately 21 KHz. The +Diff signal used to switch off the anticipation circuit 42 in this embodiment occurs approximately 130 microinches before the transducer head arrives at the desired track location.

We claim:

1. A servo control system in a magnetic disc recording device for positioning one or more magnetic transducer heads adjacent any one of a plurality of recording tracks on a rotating magnetic disc surface comprising:
   a. a linear actuator motor having a movable armature;
   b. a carriage transported by said actuator motor armature;
   c. at least one head/arm assembly supported by said carriage for radial movement of a transducer head adjacent a surface of the rotating disc surface;
   d. means responsive to the current track position of the head for generating a programmed motor velocity profile for the head to achieve a desired track location;
   e. means for generating a signal proportional to the actual velocity of the actuator motor;
   f. comparator means for deriving an error signal proportional to the difference between the programmed velocity and the actual velocity;
   g. means for anticipating zero velocity error signals to provide a compensatory signal to minimize velocity error overshoots; and
   h. means responsive to a modified error signal comprising the error and compensatory signals for accelerating and decelerating said linear motor.

2. A servo control system as in claim 1 wherein said anticipating means comprises means for providing a signal proportional to the time derivative of the velocity error signal within the system operating frequency band and an attenuated signal above said band to derive the compensatory signal.

3. A servo control system as in claim 2 wherein said anticipating means additionally includes means for further attenuating the compensatory signal above a predetermined frequency to reduce high frequency noise signals.

4. A servo control system as in claim 3 wherein said anticipating means comprises a means responsive to a signal proportional to the modified velocity error signal having a transfer function defined by $$\frac{K \cdot s}{(1 + \tau_1 s)(1 + \tau_2 s)},$$

where $K$ = derivative gain, $s$ = Laplace transform operator, and $\tau_1 > \tau_2$.

5. A servo control system as in claim 4 including means for disabling said anticipating means once the magnetic transducer head is at or near its desired position.

6. A servo control system as in claim 1 including means for disabling said anticipating means once the magnetic transducer head is at or near its desired position.

7. In a servo control system for controlling the movement of at least one magnetic transducer head relative to a rotating magnetic disc surface by means of a linear actuator motor having position and velocity modes of control, said servo control system having a velocity error signal and wherein the improvement comprises anticipatory mode means for deriving a compensatory signal proportional to the rate of change of the velocity error signal in the operating frequency range of the system, and means responsive to both the servo error signal and compensatory signal for control of the linear actuator motor.

8. A servo control system as in claim 7 including means for disabling said anticipatory means once the magnetic transducer head is at a desired location with respect to the disc surface.

9. A servo system as in claim 8 including means for attenuating said compensatory signal above the operating frequency range of the servo system.

10. A servo control system for a magnetic disc storage system for controlling the movement of at least one magnetic transducer head supported and transported by a linear motor from one position to another with respect to a rotating magnetic disc surface comprising:
    a. means for providing an error signal proportional to the difference between the actual and a programmed motor velocity;
    b. means for providing an anticipatory signal substantially proportional to the rate of change of the error signal over the bandwidth of operation of the servo system; and
    c. means responsive to the sum of said error and anticipatory signals for controlling the velocity of said linear motor.

11. A servo control system as in claim 10 wherein said anticipatory signal providing means comprises means for attenuating said anticipatory signal of frequencies above the bandwidth of operation of the servo system.

12. A servo control system as in claim 11 including means for disabling said anticipatory signal providing means once the transducer head is at a desired position.

13. A servo control system as in claim 10 including means for disabling said anticipatory signal providing means once the transducer head is at a desired position.

* * * * *